United States
Goldstein et al.

[15] 3,662,343
[45] May 9, 1972

[54] CREDIT CARD AUTOMATIC CURRENCY DISPENSER

[72] Inventors: Kenneth S. Goldstein, Dallas; John D. White, Garland, both of Tex.

[73] Assignee: Docutel Corporation, Dallas, Tex.

[22] Filed: July 29, 1970

[21] Appl. No.: 59,146

[52] U.S. Cl. .......................................... 340/149, 235/61.7 B
[51] Int. Cl. ............................................................. G06f 7/00
[58] Field of Search .................... 194/4; 340/149; 235/61.7 B; 178/22; 179/1.5 S; 35/4

[56] References Cited

UNITED STATES PATENTS

| | | |
|---|---|---|
| 3,401,830 | 9/1968 | Matthews .................... 340/149 A UX |
| 3,484,744 | 12/1969 | Gertler et al. ............... 340/149 A UX |
| 3,513,298 | 5/1970 | Riddle et al. ..................... 340/149 X |

*Primary Examiner*—Donald J. Yusko
*Attorney*—Richards, Harris & Hubbard

[57] ABSTRACT

A currency dispenser automatically delivers a medium of exchange in packets in response to a coded credit card presented thereto. The coded credit card is presented to the currency dispenser and an initial check is made to determine if the card has the proper format. After checking the credit card format, coded information thereon is evaluated to check the user's indentity prior to authorizing him to receive cash from the machine. When each of several additional checks of the credit card code have been completed, the old code is removed and substituted with a new code. The new code contains the same information as the old but updated to reflect an additional currency dispensing transaction. Both the original code and the updated code are scrambled in accordance with a changing key. Scrambling the credit card code after each use thereof minimizes the chance of unauthorized use of the currency dispenser. When the checks of the credit card indicate the user is entitled to receive the amount of currency he has selected, a storage container for the packets of currency transports the required number of packets by a positive feed drive to a cash drawer. The cash drawer opens to a detent position which allows the customer to then move the drawer to a fully open position to remove his currency. Upon release of the cash drawer, it returns to a partially opened position from which it automatically closes after a preset time limit.

68 Claims, 9 Drawing Figures

INVENTORS:
KENNTH S. GOLDSTEIN
JOHN D. WHITE

ATTORNEYS

INVENTORS:
KENNETH S. GOLDSTEIN
JOHN D. WHITE

*Richards, Harris & Hubbard*

ATTORNEYS

CREDIT CARD AUTOMATIC CURRENCY DISPENSER

This invention relates to a currency dispenser, and more particularly to a coded document-actuated currency dispenser.

Recent studies have shown that attempts are being made by the banking system to influence the general public to use fewer checks in their financial transactions. This is primarily due to the difficulty of handling and processing large amounts of paper. In its place, there appears to be a wider use of credit cards for the completion of daily household and business transactions. Although there is a continued heavy use of checks and an increasing use of credit cards, we are not likely to become a cashless society in the near future. To provide the required amount of cash to complete some business and personal transactions, banks, in the past, have opened more and more branches for customer convenience. Unfortunately, the construction and operation of these many branch banks is expensive and unprofitable.

To provide the consumer with a source of ready cash without the expense of branch banking, banks are resorting to the use of automatic currency dispensing machines that make cash available to bank customers on a 24 hour basis.

Heretofore, the available automatic currency dispensing machines lacked compatibility with bank credit cards and the convenience and speed of data processing. With many of the prior currency dispensing machines, the customer was required to yield up his identification card with each use, thereby creating handling problems and costs for the bank which were of equal magnitude with the present day check handling problems and costs. Other available machines required the customer to carry a supply of check-like vouchers, which he and the bank must replenish periodically as required. Again, this presented many of the same problems currently experienced when handling checks. Of prime importance, of course, in the operation of any automatic money dispenser is the security of the stored cash. To be acceptable, an automatic cash dispenser must be essentially tamperproof.

An object of the present invention is to provide a coded document activated automatic dispenser. Another object of the present invention is to provide a code actuated automatic currency dispensing machine. A further object of this invention is to provide code scrambling security in a code actuated dispenser. Still another object of this invention is to provide positive feed delivery in automatic dispensing apparatus. A still further object of this invention is to provide controlled, timed, sequential operation of a dispensing drawer in automatic dispensing apparatus.

In an automatic dispenser, a coded document is presented to the machine by a user. Initially, the machine performs a format check on the document to determine if the machine will properly respond. If the coded document presented is not of the correct format, it will be locked out thereby protecting the machine from an attempt to force an unauthorized document into the mechanism. If the initial check indicates the presented document has the proper format, a gate opens to permit the user to further insert the document into the machine for actuation thereof.

Upon the acceptance of a coded document by the dispensing apparatus of the present invention, the document proceeds to a first station where scrambled coded information stored thereon is read and sent to unscrambling logic. A customer's personal identification code as read from the presented document is checked by comparison with a code manually inserted by the user. If the coded customer identification number and the inserted identification number do not agree, the user is instructed to re-enter his personal code. This operation will be repeated until the customer inserts the correct code or a favorable comparison does not result after three attempts. If on the third attempt the stored code and the entered code do not agree, the coded document is transported to an internal storage bin and not returned to the user. When the customer enters an identification code which corresponds to that stored on the document presented, the date of last use, the number of previous uses in the same day, the total number of uses remaining, and the expiration date of the document are all checked. If the result of these checks indicates the user is entitled to receive the article to be dispensed, he is so informed and the document is recoded, with the data thereon updated to reflect the latest transaction.

After the code on the document as presented is read and sent to the unscrambling logic, an unscrambler converts the data into a series of separate, logically arranged data words. These data words, after being checked and updated as explained previously, are rescrambled in accordance with a scrambling key to produce a code arrangement different from the arrangement as read. Upon completion of the rescrambling, the document is recoded with the updated scrambled data. The code changing logic also includes circuitry for generating a different scrambling key for subsequent readings of the same coded documents.

In an automatic dispenser in accordance with the present invention, after the coded document has been returned to a user, a positive feed delivery system removes the article to be dispensed from a storage container. The positive feed system includes an adjustable gate for accurately metering the dispensed article. After leaving the storage container through the metering gate, the article is transported between pinch rollers and a series of belted rollers to a dispensing drawer. This drawer is actuated by an energizing signal from circuitry in response to the user removing the presented document from the machine.

To complete the automatic dispensing operation of the dispenser in accordance with the present invention, an article is deposited into the dispensing drawer. Initially, a signal energizes an actuator to position the drawer from a retracted, closed position to a partially opened detent position from which it may be drawn to a full open position by the user. After the user has removed the article and releases the drawer, it automatically returns to the partially opened detent position. A timer measures the time the drawer is in the detent position, and after a preselected interval, as governed by the timer, it returns to the closed position. If, upon initially positioning the drawer to the partially opened detent position, the user does not pull the drawer to the fully open position before the expiration of a preselected time interval, the drawer will be returned to the closed position.

A more complete understanding of the invention and its advantages will be apparent from the specification and claims and from the accompanying drawings illustrative of the invention.

Referring to the drawings.

GENERAL SYSTEM DESCRIPTION

Figure 1:
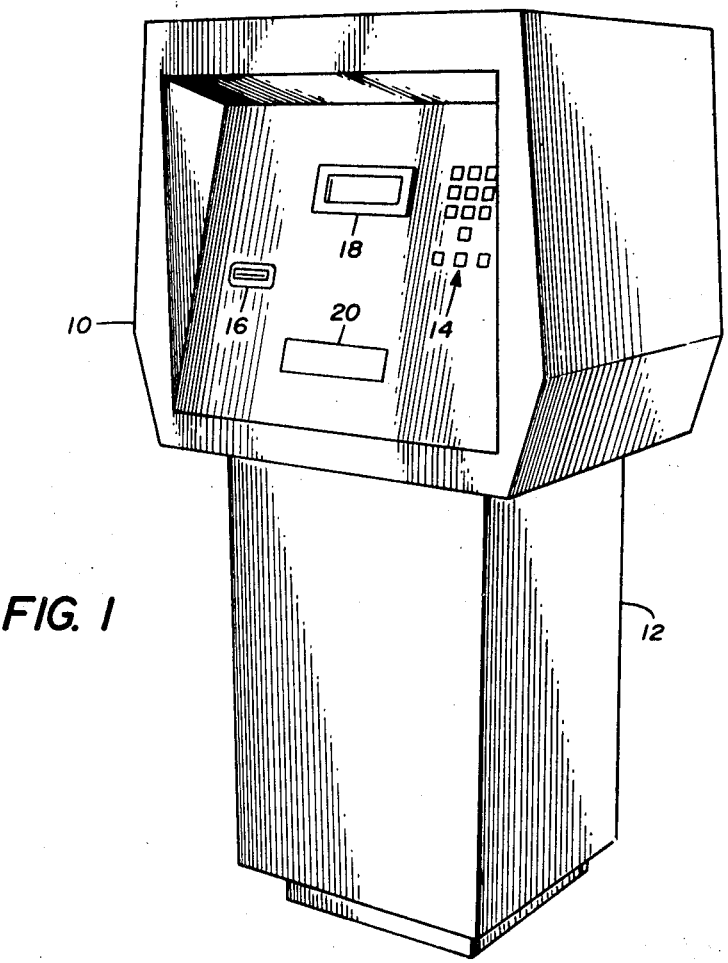
FIG. 1 is a pictorial view of a currency dispenser in accordance with the present invention.

Referring to FIG. 1, there is shown a free standing currency dispenser including a console 10 which houses mechanical operating sections of the system, and in addition customer interface equipment. In the free standing unit, the console 10 is mounted on top of an electronic module 12 which houses the system electronics and power supply. On the front panel of the console 10, there is arranged an array of 13 push button keys 14 for use by a customer to interface with the currency dispenser. Ten of these keys, marked 0 through 9, are to enable a user to insert his assigned identification code for verification of his authority to use a credit card presented to the machine through a card gate 16. One of the remaining three keys is a "clear" push button for correcting mistakes made by the user in inserting his assigned identification code. The remaining two keys are for selecting one or two currency packages to be dispensed. The amount of currency in each such package is controlled by authorized personnel.

In addition to the 13 push button keys, and the card gate 16, the front panel of the console 10 includes an instruction window display 18 that provides for viewing an illuminated display message drum. As will be explained, the messages on this drum instruct a user in the operation of the currency dispenser. The last user interface on the front panel of the console 10 is a cash drawer 20 that fits flush with the panel in a closed and locked position.

Figure 2:
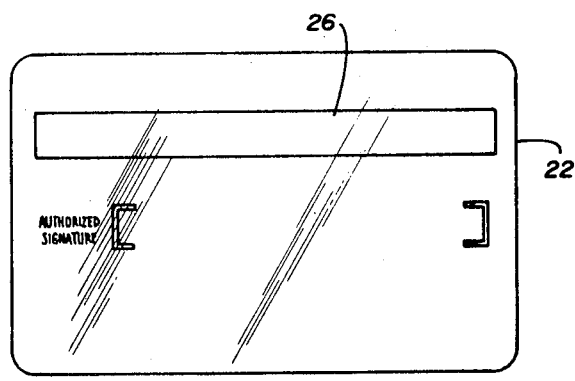
FIG. 2 illustrates a typical credit card for use with the currency dispenser of FIG. 1.

Upon presentation of a credit card 22, such as illustrated in FIG. 2, through the card gate 16 to the console 10, it is transported to a plurality of reading stations by a card reader 24 to activate the various systems in a preordered sequence. Typically, a currency dispenser in accordance with the present invention may be activated by a standard "A" size plastic credit card with a stripe 26 of magnetic material located on the backside. The magnetic stripe allows up to 80 numeric characters in four rows to be magnetically encoded for use in providing a complete identification and record of each transaction with the currency dispenser. A magnetic credit card for use in the system described contains the following information:
 a. Expiration Date (Year [two digits] and Month [two digits]),
 b. Total Allowed Uses (Up to 999 [three digits]),
 c. Allowed Uses Per Day (Up to nine [one digit]),
 d. Account Number (Variable from six to 14 digits),
 e. Customer Identification Code (six digits),
 f. Bank Routing and Transit Number (eight digits),
 g. Date Last Used (Month [two digits], Day [two digits]), and number of times used per day (one digit),
 h. Bank Identification Number (four digits), and
 i. Bank Branch Number (three digits).

As the credit card 22 moves through the card reader 24, each of the above pieces of information is checked at one of several reading stations. Although many credit card readers are available, the card reader illustrated includes a drive motor 27 activated by a signal from the electronic module 12 and coupled to a series of drive rollers through a belt 28. The series of rollers comprises pinch roller pairs distributed longitudinally along the length of travel of a credit card. In addition to reading stations responsive to the magnetically coded information on the stripe 26, the card reader 24 also includes writing stations for recoding a credit card during completion of a currency dispensing operation.

In the normal currency dispensing cycle, a credit card is transported through the card reader 24 in one direction during a first part of a sequence and then returned to the user through the card gate 16 at the second-to-last step in the completion of a cycle. Under certain circumstances, a credit card presented to the machine is retained and not returned to the user. A card retained by the machine is transported through the card reader 24 into an internal storage bin 30. This bin is accessible only to authorized persons having access to the inside of the console 10.

Figure 3:
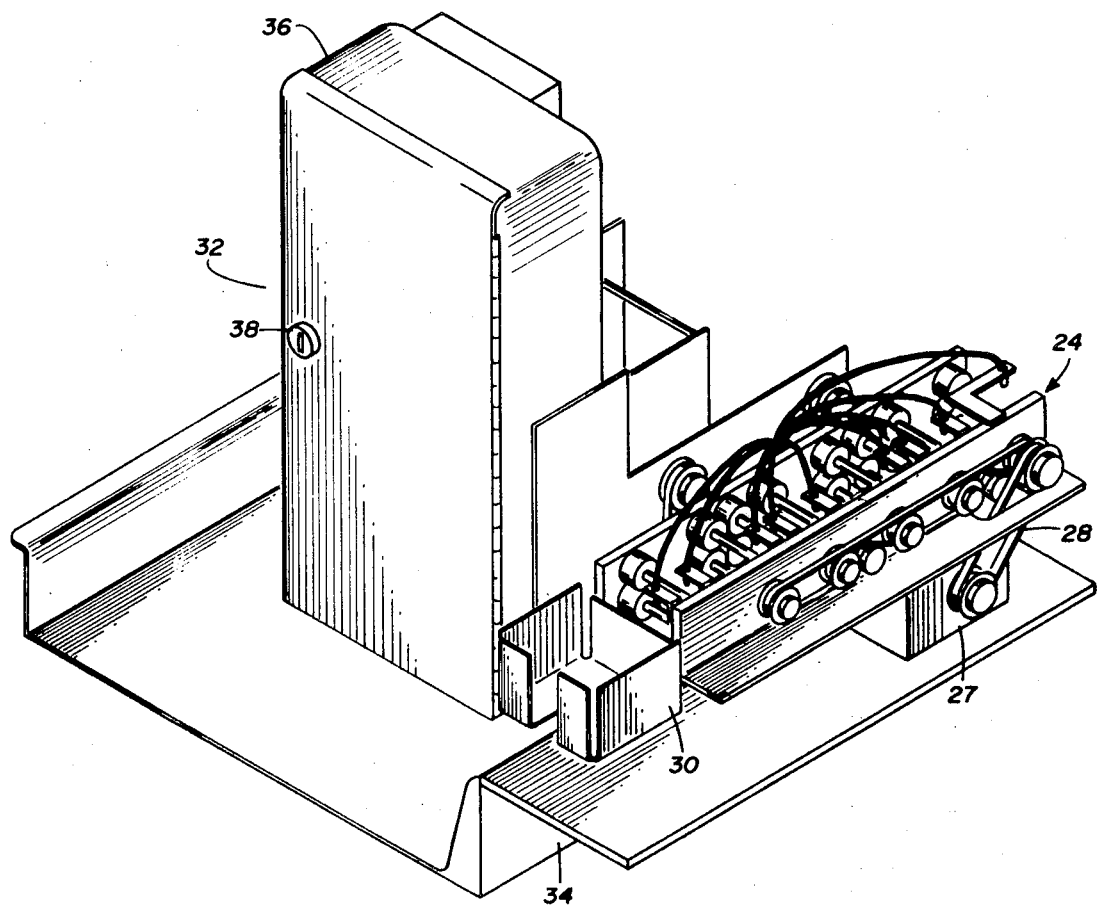
FIG. 3 is a perspective view of a currency packet delivery system and credit card transport system for the dispenser of FIG. 1.

After several verification steps have determined a user is entitled to the currency he has requested, a cash transport 32 is activated by a signal from the electronic module 12 to deliver packets of currency to the cash drawer 20. As illustrated in FIG. 3, the cash transport 32 is mounted alongside the card reader 24 on an equipment rack 34 contained within the console 10. Currency to be dispensed is stored in a cabinet 36 having an opening for feeding packets of currency to a money transport system, as will be explained. Although the console 10 contains security locks to restrict unauthorized entry into the unit, the cabinet 36 also includes a lock 38 for securing money packets stored within the cabinet.

Figure 4:
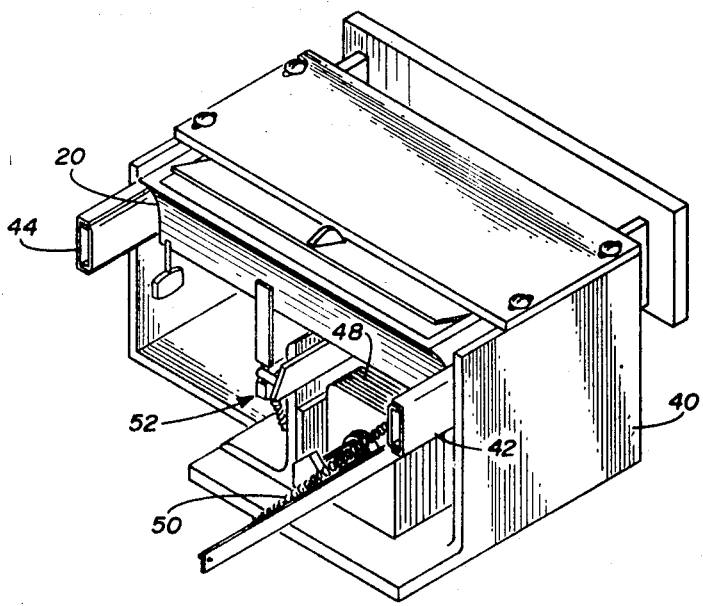
FIG. 4 is a perspective view of the cash drawer for the dispenser of FIG. 1.

Money packets delivered from the cash transport 32 in response to instructions from the electronic module 12 are delivered to the cash drawer 20 included as part of a separate subsystem as illustrated in FIG. 4. The cash drawer 20 is contained within a housing 40 and moves between a closed position as illustrated in FIG. 1 to a partially opened position as illustrated in FIG. 4 along tracks 42 and 44. In addition to numerous switches for sensing the operation of the cash drawer 20, the housing 40 contains a linear motor 48 for forcing the drawer from a closed position to a detent position, as will be explained. Upon receipt of a control signal from the electronic module 12, a latch solenoid is energized and allows a spring 50 to return the drawer 20 to the closed position. A latch mechanism, generally indicated by the numeral 52, locks the drawer 20 in the closed position.

GENERAL SYSTEM OPERATION

In operation of the console 10 and the electronic module 12 to dispense currency to a user, the display 18 instructs a customer to insert his credit card into the card gate 16. This is the first step in a sequence of step-by-step operating instructions leading to a complete transaction.

A second instruction appearing at the display 18 instructs a user to key-in his identification code. This requires that the customer's personal identification number be entered by means of the numbered push button keys 14. By operation of the electronic module 12, the keyed-in number is verified with the number magnetically encoded on the stripe 26 of the customer's credit card 22. If the wrong keys are accidentally pressed before completing a number, the "clear" key is provided to allow the user to try again. On the third incorrect attempt at verification, the card reader 24 delivers the inserted credit card to the bin 30. (This feature is a safeguard against the use of lost or stolen cards). In this situation, an instruction will appear at the display 18 telling a customer his card has been retained. A printed receipt is then issued telling the user why his card has not been returned.

Following verification, the message "Key In Amount Desired" appears in the lighted display 18. The user now selects one of two fixed amounts, prepackaged in the cash transport 32, by means of one of two currency-amount key push buttons 14. The requested cash amount is delivered to the cash drawer 20 along with a receipt of the transaction. A receipt is printed and issued to a user upon the termination of each transaction whether the transaction has been completed by the dispensing of currency or by a machine detected error. In the latter situation, the receipt explains to the user why currency was not dispensed.

Upon delivery of the currency and the receipt to the cash drawer 20, the electronic module 12 generates a signal to automatically open the cash drawer to a detent position for delivery of the cash and receipt to the user. The cash drawer 20 must be manually extended to facilitate removal of its contents, after which it is automatically retracted and locked by means of the spring 50 and the latch 52. Upon completion of the latching of the drawer 20, the transaction has been completed and the machine is ready for a subsequent transaction.

DETAILED OPERATING SEQUENCE

Figure 5:
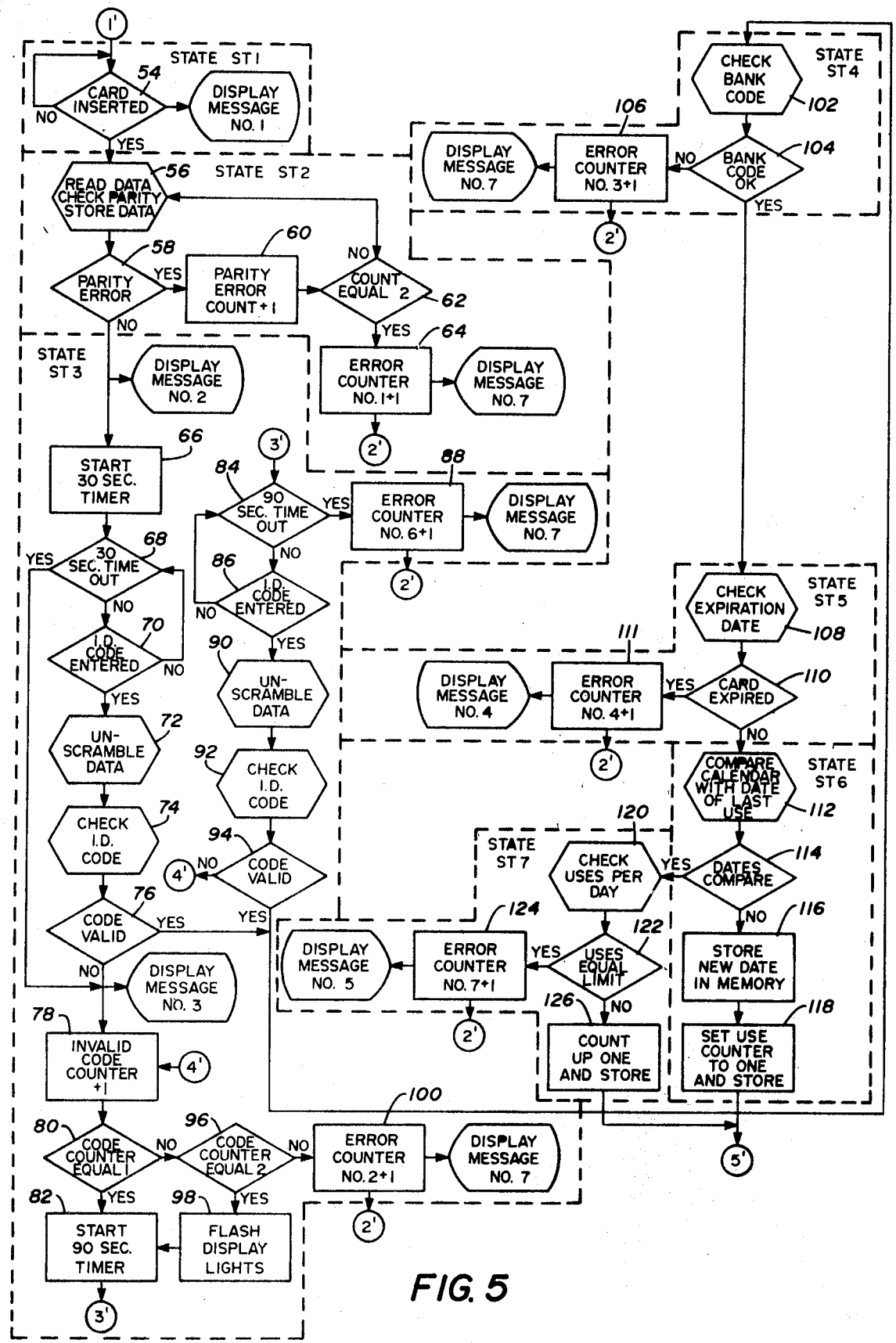
FIGS. 5 through 7 illustrate a flow diagram giving the steps in the operation of the currency dispenser for money delivery to a user of a valid credit card.
Figure 6:
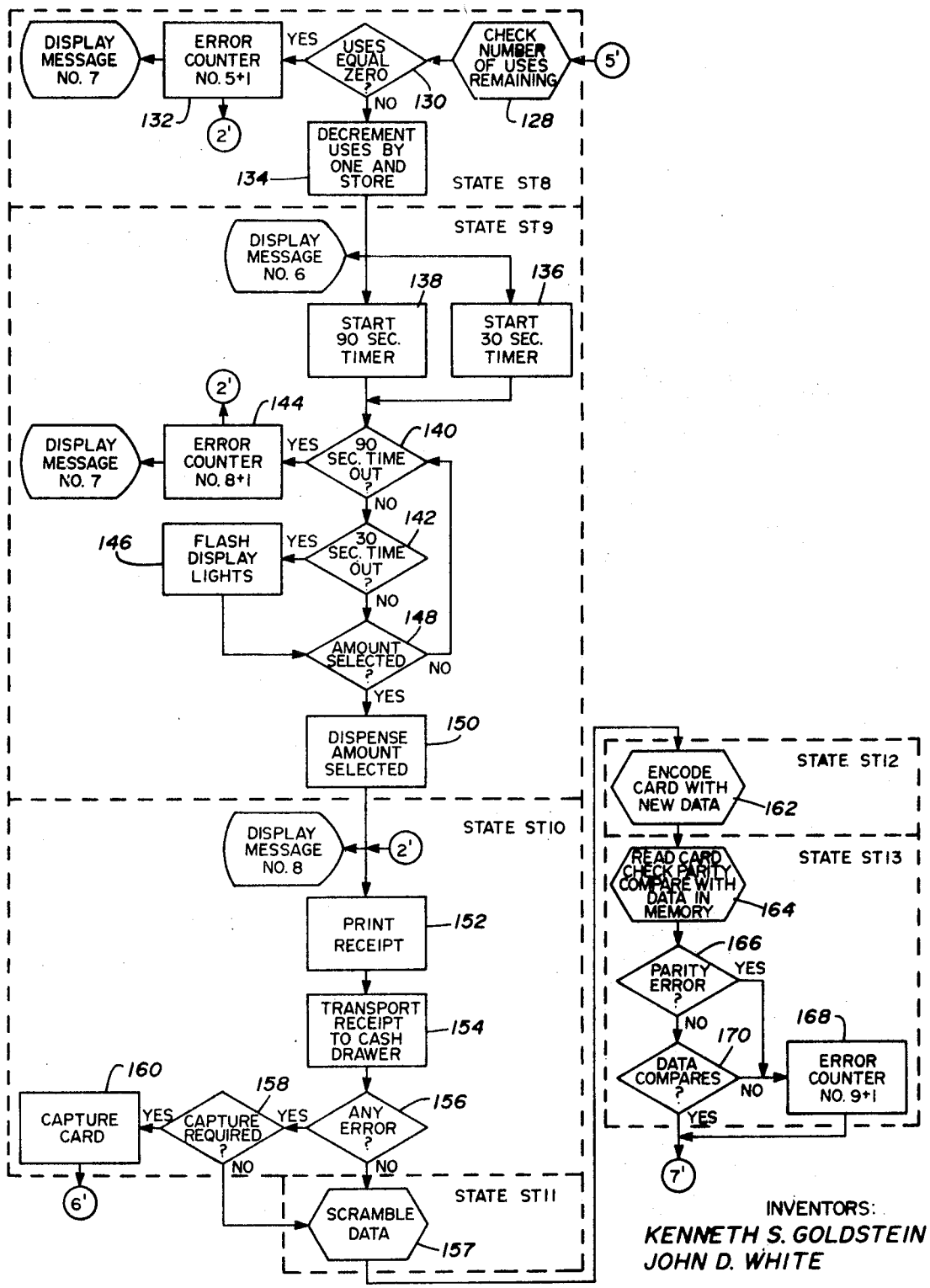
Figure 7:
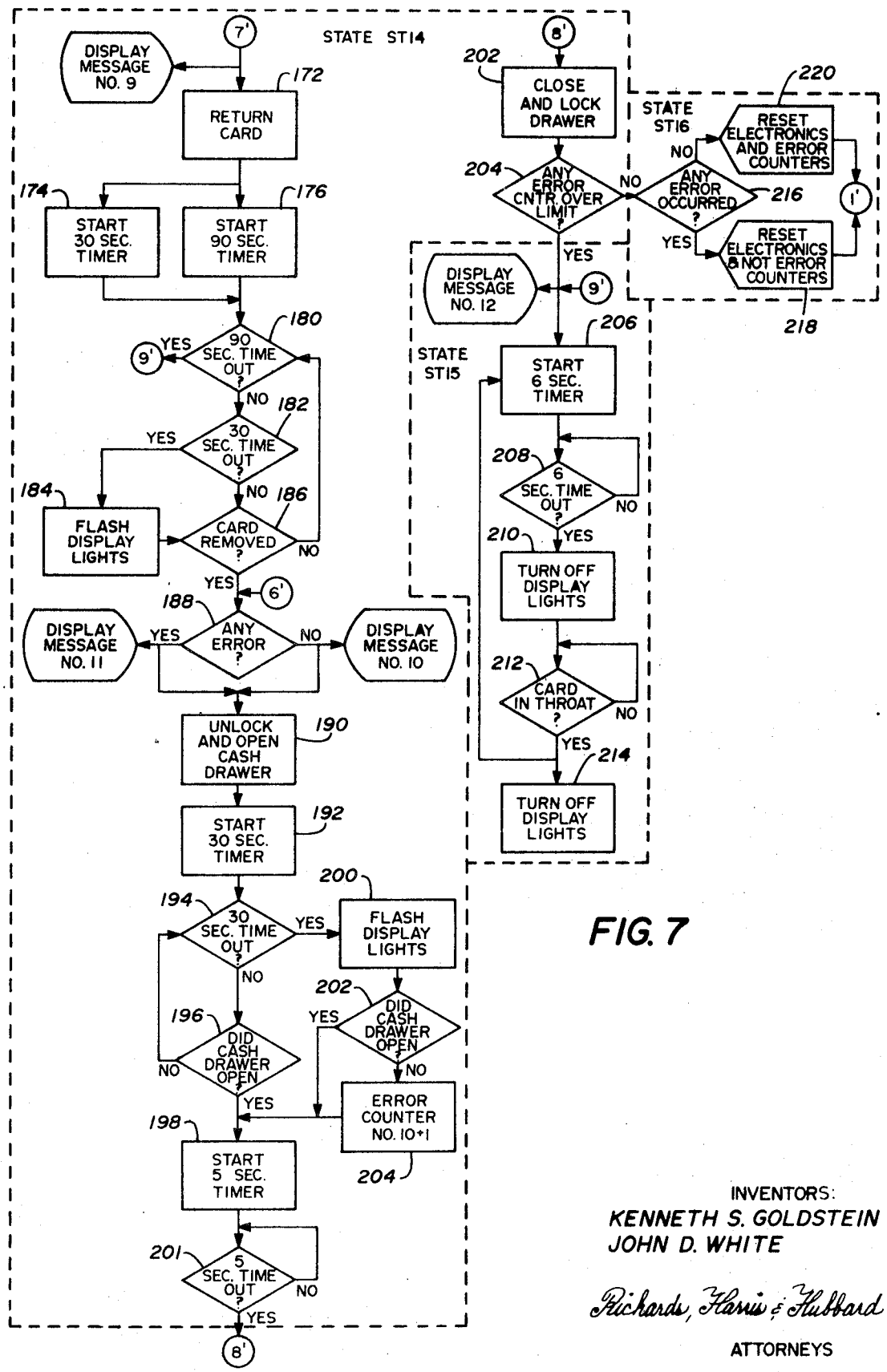

For a detailed operation of the step-by-step sequence of the currency dispenser, reference is made to FIGS. 5 through 7.

In the initial state (ST1) of the currency dispenser, message No. 1 of Table I will appear at the display 18. Electronic module 12 activates an inquiry 54 to determine if a card has been inserted through the gate 16 after the card format has been checked.

TABLE I

DISPLAY MESSAGES

1. Insert Card
2. Enter I.D. Code
3. Enter I.D. Code Again
4. Card Has Expired
5. Uses Per Day Exceeded
6. Select Amount Desired
7. Transaction Not Complete—Bank will contact you
8. Receipt Being Printed
9. Remove Card
10. Remove Currency and Receipt
11. Remove Receipt
12. Out of Order Upon a positive response from the inquiry 54, the sequence proceeds to state ST2. In state ST2, the card reader 24 positions the advancing credit card, and the module 12 completes step 56 to read the scrambled data from the inserted card, check the parity, and store the data read from the stripe 26. State ST2 continues with inquiry 58 to determine if a parity error exists. A positive response to the inquiry 58 advances the sequence of state ST2 to step 60 and then to inquiry 62. A "yes" response to inquiry 62 advances state ST2 to step 64 to cause message No. 7 of Table I to appear at the display 18. Step 64 also advances the sequence of operation to state ST10; state ST10 will be explained shortly. A "no" response to inquiry 62 returns state ST2 to step 56 and in turn to inquiry 58.

Step 64 makes a check to determine the number of times a parity error has produced a "yes" response to the injury 64. If the number of times step 64 has been reached equals an internally set limit, error counter No. 1 of Table II, then the machine will terminate the present transaction and shut down. For error counter No. 1, on the seventh attempted successive use of the machine which results in a "yes" response to inquiry 62, the machine will shut down. After each successful completion, however, the error counter will reset to zero.

TABLE II

Error Counter Limits

| Counter No. | Limit |
| --- | --- |
| 1. Parity Error | 6 |
| 2. Invalid I.D. Code | 3 |
| 3. Invalid Bank Code | 6 |
| 4. Expired Card | 3 |
| 5. Total Uses Exceeded | 6 |
| 6. Too Much Time Used To Key In I.D. Code | 3 |
| 7. Uses Per Day Exceeded | 6 |
| 8. Too Much Time Used To Select Amount | 2 |
| 9. Echo Check Error | 3 |
| 10. Drawer Did Not Open | 2 |

A negative response to the "parity error" inquiry 58 advances the sequence of operation to state ST3. Initially, in state ST3, message No. 2 of Table I appears at the display 18. Simultaneously, a 30 second timer, step 66, is initiated by the electronic module 12. Message No. 2 instructs a user to enter his personal identification number into the machine by means of the push button keys 14. When the user is inserting his personal identification number into the machine, the sequence of operation advances to inquiry 68 to determine if the 30 second limit of step 66 has been exceeded. A "no" response to inquiry 68 advances state ST3 to inquiry 70 to determine if a user's identification code has been entered. If the response to inquiry 70 is "no," the sequence returns to inquiry 68. Inquiries 68 and 70 are continually repeated until either one or the other produces a "yes" response.

A positive response from inquiry 70, indicating that a code has been entered, advances state ST3 to step 72 wherein the scrambled coded data, as read from the magnetic stripe 26, is unscrambled. After unscrambling the data from the stripe 26, the sequence advances to step 74 wherein a comparison of the customer-entered identification code with the card identification code is made. Upon completion of the comparison step 74, the electronic module 12 advances the sequence to inquiry 76 to determine if the customer-entered code and the code read from the magnetic stripe 26 are identical. A "no" response to inquiry 76 advances state ST3 to step 78 and causes message No. 3 of Table I to appear at the display 18. State ST3 is also advanced to this same position upon a "yes" response to inquiry 68 indicating that the 30 second timer 66 has timed out.

Step 78 is completed by the electronic module 12 to determine the number of times an incorrect identification code has been entered by the user. This determination is checked by inquiry 80. Upon the first entering of an incorrect identification code by a user, inquiry 80 produces a positive response advancing state ST3 to step 82 which starts a 90 second timer. At this time, the user is instructed to re-enter his identification code through the push button keys 14 in response to message No. 3 appearing at the display 18. The cycle of operation continues at inquiry 84 with the sequence being continuous between step 82 and inquiry 84. A "no" response to inquiry 84 advances the sequence to inquiry 86 to determine if an identification code has been entered. Inquiries 84 and 86 are continuously cycled until either one or the other produces a "yes" response.

A "yes" response to inquiry 84 indicates that the 90 second timer 82 has timed out and state ST3 advances to step 88. Upon completion of step 88, the sequence advances to state ST10 and the transaction is terminated. As a result of state ST3 advancing to step 88, message No. 7 of Table I appears at the display 18.

Step 88 checks to determine how many previous cycles, i.e., previous uses of the machine, have advanced to that point as a result of timing out of the 90 second timer. When the number of times the sequence has advanced to step 88 equals a set error number, the machine will terminate the present transaction and shut down. For a time out error, the machine will shut down after the fourth sequence, error counter No. 6 of Table II, in succession has advanced to step 88 as a result of the 90 second timer timing out.

A "yes" response to the inquiry 86 advances state ST3 to step 90 wherein the data read from the magnetic stripe 26 and stored in step 56 is unscrambled. After completing the unscrambling step 90, the sequence advances to step 92 where the entered identification code and the unscrambled code are compared. This advances state ST3 to inquiry 94 which is made to determine if the user-entered code and the credit card code favorably compare.

A "no" response to the inquiry 94 returns state ST3 to step 78. Inquiry 80 is again made and the response this time will be negative, advancing state ST3 to inquiry 96. This being the second attempt to insert the correct identification code, inquiry 96 produces a "yes" response advancing state ST3 to step 98 which causes the display 18 to flash message No. 3 and return the sequence to the 90 second timer, step 82. The sequence of steps of inquiries 84 through 94 is repeated. Another "no" response to inquiry 94 again returns the sequence to step 78 and inquiries 80 and 96 are again made. At this time, inquiry 98 will result in a "no" response advancing state ST3 to step 100. In step 100, the electronic module 12 makes an error limit check to determine how many times state ST3 has advanced to this position. When the number of times that state ST3 has advanced to step 100 equals a stored limit, the machine will shut down upon completion of the present transaction. For step 100, the error counter No. 2 of Table II gives the number of successive times an incorrect I.D. code will shut down the machine. The present transaction advances to state ST10 and message No. 7 of Table I appears at the display 18. If this is not the fourth successive attempt to use the machine, the present transaction will be terminated and the machine will be returned to the initial state.

A positive response to either inquiry 76 or inquiry 94, indicating a valid code has been entered through the push button keys 14, advances the transaction to step 102 of state ST4. In step 102, the module 12 compares the bank code read from the magnetic stripe 26 of the inserted credit card, after unscrambling, with a bank code stored in the module 12. Upon completion of step 102, state ST4 advances to inquiry 104. A "no" response to inquiry 104 advances the sequence to step 106 and message No. 7 of Table I appears at the display 18. Step 106 compares the number of times the overall sequence has advanced to that state with a preset limit, error counter 3 of Table II. If the number of times the sequence advances to step 106 does not equal the stored limit, the sequence advances to state ST10 and completes the transaction. If the error limit plus one has been reached, the machine will shut down.

A "yes" response to inquiry 104 completes state ST4 and advances the sequence to state ST5. Initially, in state ST5, step 108 is completed. Step 108 is a further check on the data read from the magnetic stripe 26. Step 108 compares the expiration date of the credit card with the calendar date. Inquiry 110 is made and a positive response advances state ST5 to step 111 and message No. 4 of Table I appears at the display 18. In step 111, the module 12 determines the number of times the sequence has advanced to this point, error counter 4 of Table II. If the sequence advances to step 111 once more than the number of times as stored in the module 12, the sequence advances to state ST10 and shuts down. If there has been three or less successive sequences advanced to step 111, the present transaction will be completed and the machine returned to the initial state. A "no" response to inquiry 110 completes state ST5 and advances the operation to state ST6.

In state ST6, the first operation, step 112, compares the calendar date with the date of last use as read from the magnetic stripe 26. If the calendar date does not agree with the date of last use, indicating the card has not been used that day, inquiry 114 results in a "no" response and state ST6 advances to step 116. Step 116 stores the calendar date in a memory of the electronic module 12 for subsequent encoding on the magnetic stripe 26. Upon completion of storage of the calendar date, state ST6 advances to step 118. Step 118 sets a use counter to 1 and stores this information in a memory for subsequently encoding on the magnetic stripe 26.

A "yes" response to the inquiry 114, indicating that the card has been previously used on the calendar date, advances the sequence from state ST6 to state ST7. In state ST7, step 120 compares the number of uses made for that day with an established use limit. If the number of uses of the card in the card reader 24 equals the established limit, an inquiry 122 results in a "yes" response thereby advancing state ST7 to step 124 and message No. 5 of Table I appears at the display 18. In step 124, the electronic module 12 compares the number of times the sequence has advanced to that point with a stored number, error counter 7 of Table II. If state ST7 advances to step 124 by an amount equal to the stored limit plus one, indicating seven successive uses of the machine have advanced the sequence to step 124, the machine will complete the present transaction by advancing to state ST10 and then shut down. If less than seven successive uses has advanced the sequence to step 124, the present transaction will be completed through state ST10 and the machine returned to the initial state.

A "no" response to inquiry 122 advances state ST7 to step 126 which adds another use to the total number of uses per day and stores this information for subsequent encoding on the magnetic stripe 26.

Upon completion of either step 118 of state ST6 or step 126 of state ST7, the machine operation advances to state ST8, as appears in FIG. 6. Initially, in state ST8, step 128 compares the number of total uses made of the credit card with the total number of allowed uses. Note that this is not the uses allowed per day, but rather the total number of uses that can be made of a credit card. If the number of total uses remaining equals zero, an inquiry 130 results in a "yes" response advancing state ST8 to step 132 and causing message No. 7 of Table I to appear at the display 18. In step 132, the electronic module 12 checks to determine the number of times state ST8 has advanced to this point, error counter 5 of Table II. If it has advanced to the total number of times allowed, the sequence will advance to state ST10 and complete the present transaction by retaining the card and printing a receipt advising the user his card has been retained. A "no" response to the inquiry 130 indicates that another use of the credit card 22 remains and state ST8 advances to step 134. Step 134 reduces the total number of remaining uses by one and advances the sequence to state ST9.

Initially, in state ST9, message No. 6 of Table I appears at the display 18 and the 30 second timer of step 136 and the 90 second timer of step 138 are activated. Electronic module 12 monitors both the 90 second timer, step 138, and the 30 second timer, step 136, by inquiries 140 and 142, respectively. Inquiry 140 checks the 90 second timer of step 138. If the 90 second timer has timed out, inquiry 140 results in a "yes" response advancing state ST9 to step 144 and causing message No. 7 to appear at the display 18. Step 144 is one of those that checks the operation of the complete system. In step 144, the module 12 evaluates the number of times the 90 second timer has timed out, error counter 8 of Table II. If the number of times step 144 has been reached equals the number stored in the module 12 plus one, the machine will complete the present transaction and shut down. If the limit has not been reached, the present transaction will be completed and the machine returned to the initial state. The present transaction is completed by advancing the sequence from step 144 to state ST10.

A "no" response to the inquiry 140 advances state ST9 to inquiry 142 which checks the 30 second timer, step 136. If the 30 second timer has timed out, inquiry 142 produces a "yes" response thereby initiating step 146 which produces a flashing display 18. The message at 18 will be to instruct the user to select the amount of currency desired to be dispensed. Upon either a "no" response to the inquiry 142 or upon completion of step 146, state ST9 advances to the inquiry 148. If an amount of currency to be dispensed has not been selected by the user, inquiry 148 results in a "no" response thereby returning the sequence to inquiry 140. After a user has selected the amount of currency to be dispensed, the inquiry 148 produces a "yes" response and state ST9 advances to step 150. Step 150 activates the cash transport 32 to deliver the number of required currency packets to the cash drawer 20. After delivery of the currency packets to the cash drawer 20, state ST9 is completed and the sequence advances to state ST10.

Initially, in state ST10, message No. 8 of Table I appears at the display 18 and step 152 is completed. In step 152, the electronic module 12 activates a receipt printer to generate a receipt of the transaction. This receipt is transported to the cash drawer 20 in step 154. Upon completion of step 154, state ST10 advances to inquiry 156. Inquiry 156 is made to determine if state ST10 has been reached through states ST1 to ST10 in a normal sequence, or whether an error has advanced the sequence, out of order, to state ST10. In the latter situation, when an error has advanced the sequence to state ST10, the sequence advances to inquiry 158. Inquiry 158 is made to determine whether the error requires the capture of the credit card in the reader 24. A "yes" response will result from inquiry 158 when (1) three attempts have been made to insert an identification code, all of which were erroneous, (2) the expiration date of the card has passed, or (3) the total number of uses has been reached. The result of a "yes" response to inquiry 158 advances the sequence to step 160 wherein the electronic module 12 activates the card reader 24 to deliver the card to the storage bin 30. After completion of step 160, the sequence advances to state ST14, shown in FIG. 7.

If the sequence of operation of the machine has advanced to state ST10 through a normal operating cycle, the inquiry 156 produces a "no" response. This completes state ST10 and advances the operation to step 157 of state ST11. A "no" response to the inquiry 158 also completes state ST10 and advances the sequence to state ST11. The only step completed in state ST11 is that of rescrambling the data to be stored on the magnetic stripe 26.

Upon completion of the scrambling technique, the sequence advances to state ST12 wherein step 162 encodes the magnetic stripe 26 with the scrambled updated data. Step 162 comprises the entire operation of state ST12; upon completion of the encoding of the credit card, the sequence advances to state ST13.

In state ST13, the first operation, step 164, reads the encoded card to check the parity and compare the updated data with data stored in memory in the electronic module 12. Upon completion of step 164, inquiry 166 is made to determine if there are any parity errors. A parity error produces a "yes" response to inquiry 166 and advances the sequence to step 168. Step 168 is an error determining step for checking the overall operation of the machine, error counter 9 of Table II. When the state ST13 has reached step 168, the module 12 checks to determine how many previous occasions this step has been reached. If it equals a preset number of times plus one, four in this case, the sequence advances to complete the present transaction and the machine shuts down. Step 168 will be reached if the result of inquiry 166 is positive or if the inquiry to 170 is negative. Inquiry 170 is made when the inquiry 166 results in a negative answer.

A positive response to the inquiry 170 completes state ST13 and advances the sequence to state ST14, FIG. 7. Upon reaching state ST14, message No. 9 of Table I appears at the display 18 and a return card step 172 is completed. The return card step 172 is performed by the card reader 24 giving the user access to his credit card through the card gate 16. Upon returning the credit card 22 to the card gate 16, a 30 second timer of step 174, and a 90 second timer of step 176, are activated. Following activation of these timers, an inquiry 180 is made to determine if the 90 second timer has timed out before the user removes his card. If the inquiry 180 produces a "yes" response indicating that the 90 second timer of step 176 has timed out, the remainder of state ST14 is bypassed and the sequence advances to state ST15.

A "no" response to the inquiry 180 indicates that the 90 second timer is still running and the sequence advances to the inquiry 182. Inquiry 182 is made to determine if the 30 second timer of step 174 has timed out. A "yes" response to the inquiry 182 advances the sequence to step 184. In step 184, the electronic module 12 flashes message No. 9 of Table I on the display 18 in an effort to attract the user's attention. Upon completion of step 184, that is, flashing the display 18, the sequence of state ST14 advances to inquiry 186. State ST14 also advances to inquiry 186 upon a negative response from the inquiry 182.

Inquiry 186 is made to determine if the user has removed his credit card from the card gate 16. A "no" response to this inquiry returns the sequence to inquiry 180. A positive response to the inquiry 186, indicating that the user has removed his credit card, advances the sequence to inquiry 188. Inquiry 188 is also activated upon a positive response to the inquiry 158 of state ST10. A positive response to inquiry 188 causes message No. 1 of Table I to appear at the display 18 and a negative response to this inquiry causes message No. 10 of Table I to appear at the display 18. In either case, state ST14 advances to step 190. In step 190, the electronic module 12 activates the latch 52 and energizes the linear motor 48 to position the cash drawer 20 to the detent position. At the same time a 30 second timer of step 192 is activated. Inquiry 194 is made as a check to determine when the timer of step 192 has timed out. A negative response to step 194 advances the sequence of state ST14 to inquiry 196. Inquiry 196 is made to determine if the cash drawer has been extended to facilitate removal of its contents. A "no" response to inquiry 196 returns the sequence to inquiry 194. A "yes" response to inquiry 196 advances the sequence of state ST14 to step 198.

State ST14 also advances to step 198 upon a positive response to the inquiry 194. Such a response advances the sequence to step 200 which is a flashing light operation to cause the display 18 to flash either message No. 10 or message No. 11. After the flashing operation has commenced, inquiry 202 is made to determine if the cash drawer 20 has been extended to remove the contents thereof. A "no" response to the inquiry 202 advances the sequence to step 204 which is an error counter operation. In step 204, the electronic module 12 checks to determine in how many successive sequences has the drawer not been opened after advancing to this step. If the step 204 has been activated a number of times equal to a preset value stored in the electronic module 12, error counter 10 of Table II, the system will complete the present transaction and shut down.

Upon a "yes" response to the inquiry 202 or upon a completion of the step 204, state ST14 advances to step 198. Step 198 includes a 5 second timer for timing how long the cash drawer is held in the detent position after being manually extended. Upon starting the 5 second timer of step 198, inquiry 201 is made to check the operation of the timer. A "no" response to the inquiry 201 indicates that the 5 second timer has not timed out and inquiry 201 is continuously made until a positive response results.

A positive response to the inquiry 201 advances the sequence to step 202 which activates the latch 52 to allow the spring 50 to automatically retract the cash drawer 20. A latch then locks the cash drawer 20 until the next transaction.

Upon completion of the step 202, an inquiry 204 is made. Inquiry 204 is made to determine if any of the error counter steps have been activated. If any of the error counting steps have been activated, the inquiry 204 produces a positive response.

A positive response to the inquiry 204 completes state ST14 and advances the sequence to state ST15. The sequence of state ST15 is also initiated as the result of a positive response to the inquiry 180 of state ST14. Initially, message No. 12 of Table I appears at the display 18 and a step 206 is activated to start a 6 second timer. The entire purpose of state ST15 is to display message No. 12 and turn off the display lights. This state includes inquiry 208 which cycles until the timer of step 206 has timed out. At that time, the inquiry 208 produces a "yes" response thereby activating step 210 to turn off the display lights. State ST15 is completed by inquiry 212 and step 214.

If the inquiry 204 results in a negative response, indicating that currency was dispensed without activating any of the error counting steps, the sequence advances to state ST16. State ST16 is a state in which the machine resets itself in preparation for another cycle. Initially, in state ST16, an inquiry 216 is made. A positive response to inquiry 216 activates step 218 and a negative response activates step 220. Both steps 218 and 220 ready the console 10 for inquiry 54 of state ST1.

CODE SCRAMBLING

In step 56 of state ST2, coded data in scrambled form is read from the magnetic stripe 26 of the credit card 22 inserted into the gate 16. As explained, the data is read by sensing devices in the card handler 24 at appropriately spaced reading stations. After unscrambling the data read from the credit card 22, and comparing it with a user's identification code, currency packets are dispensed if a favorable comparison results. During the sequence of operation, the data is rescrambled and rewritten on the magnetic stripe 26 before returning the credit card 22 to a user.

Figure 8:
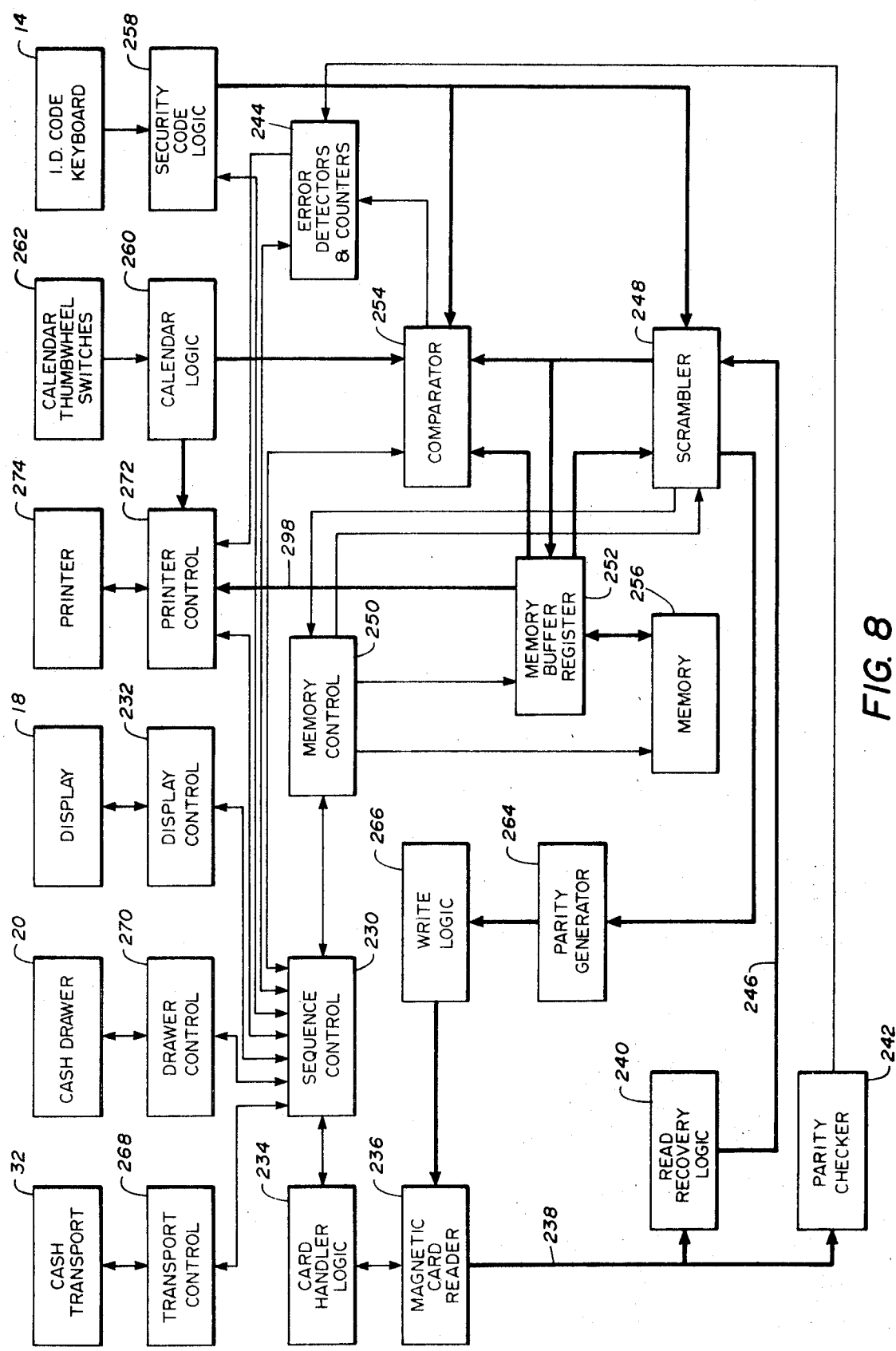
FIG. 8 is a block diagram of the currency dispenser of the present invention including the code scrambling subsystem.

Referring to FIG. 8, there is shown a block diagram of the dispensing system, including the code unscrambling and rescrambling subsystem. A sequence controller 230, as part of the electronic module 12, generates timing and sequencing signals to each of the various subsystems. Accordingly, the sequence controller 230 generates a series of signals to a display control network 232 for operating the display 18 to present the 12 messages of Table I to a user. The sequence controller 230 also generates the timing and operating signals to a card handler logic network 234 that controls the card transport 24. When the card handler logic network 234 receives positioning signals from the card transport 24 (FIG. 3), a logic signal is generated to a magnetic card reader 236 to read the data from the magnetic stripe 26, as in step 56 of state ST2. Data read by the magnetic card reader 236 is transported on a data channel 238 to read recovery logic 240 and a parity checker 242. The parity checker 242 completes inquiry 58 of state ST2. A parity error results in a logic signal being generated to an error detector and counter network 244. When receiving a signal from the parity checker 242, the error detector and counter 244 completes step 64 of state ST2, then generates a signal to the sequence controller 230 to advance the sequence to state ST10, as explained.

Assuming a negative response to the inquiry 58 of state ST2, then scrambled data from the credit card 22 is transported through the read recovery logic 240 over a channel 246 to a code scrambler 248. Upon receipt of a control signal from the memory control 250, which is advanced by timing signals from the sequence controller 230, the code scrambler 248 transmits the scrambled data to a memory buffer register 252. The memory buffer 252 serves as a means for directing streams of data bits into a memory 256. Like the code scrambler 248, both the memory register 252 and the memory 256 are sequenced by control signals from the memory control 250.

A user's code, as generated by the key pushbuttons 14, is transmitted to a comparator 254 and the code scrambler 248, through a security logic network 258 under the control of the sequence controller 230. This operation is completed when a user responds to message No. 2 appearing at the display 18, instructing him to insert his personal code, as explained. The code scrambler 248 uses the user code to generate an unscrambling key for the scrambled data read from the magnetic stripe 26. After unscrambling the data to produce a clear (decoded) data bit stream, the clear data is stored in a separate portion of the memory 256 reserved for clear data. The clear data is then transmitted to the comparator 254 for a comparison with the user code as entered therein. Various other comparisons or checks are made as detailed in the flow chart of FIGS. 5 through 7. One of the checks compares the date of last use with the calender date as entered into the comparator 254 through a calendar logic network 260 as generated by a series of calender thumb-wheel switches 262.

After all the comparisons of the credit card data have been made, and the user is entitled to the requested currency, the clear data in the memory 256 is returned to the code scrambler 248 for rescrambling prior to rewriting on the credit card 22. The new scrambled data is then stored in the scrambled data section of the memory 256. Prior to transmitting the new scrambled data to the credit card 22, it is again transmitted to the comparator 254 to determine the correctness of the updated scrambled data. Upon completion of this check, the updated scrambled data is transmitted through a parity generator 264 to a write logic network 266 for rewriting on the magnetic stripe 26 of the credit card 22.

Upon return of the credit card 22 to the user in step 172 of state ST14, the card handler logic network 234 generates a signal to the sequence controller 230 to initiate the operation of the cash transport 32 and subsequently the cash drawer 20. The particular sequence of the cash transport 32 is controlled by a dispenser network 268 in response to signals from the sequence controller 230. Likewise, the cash drawer 20 operation is under the control of a drawer control network 270, also in response to signals from the sequence controller 230.

As one of the final steps in the operation of the cash transport 32, the sequence controller 230 activates a printer control network 272 to actuate a printer 274. The printer 274 prints a receipt of the transaction which is transported by the cash transport 32 to the cash drawer 20 for delivery to the user.

Figure 9:
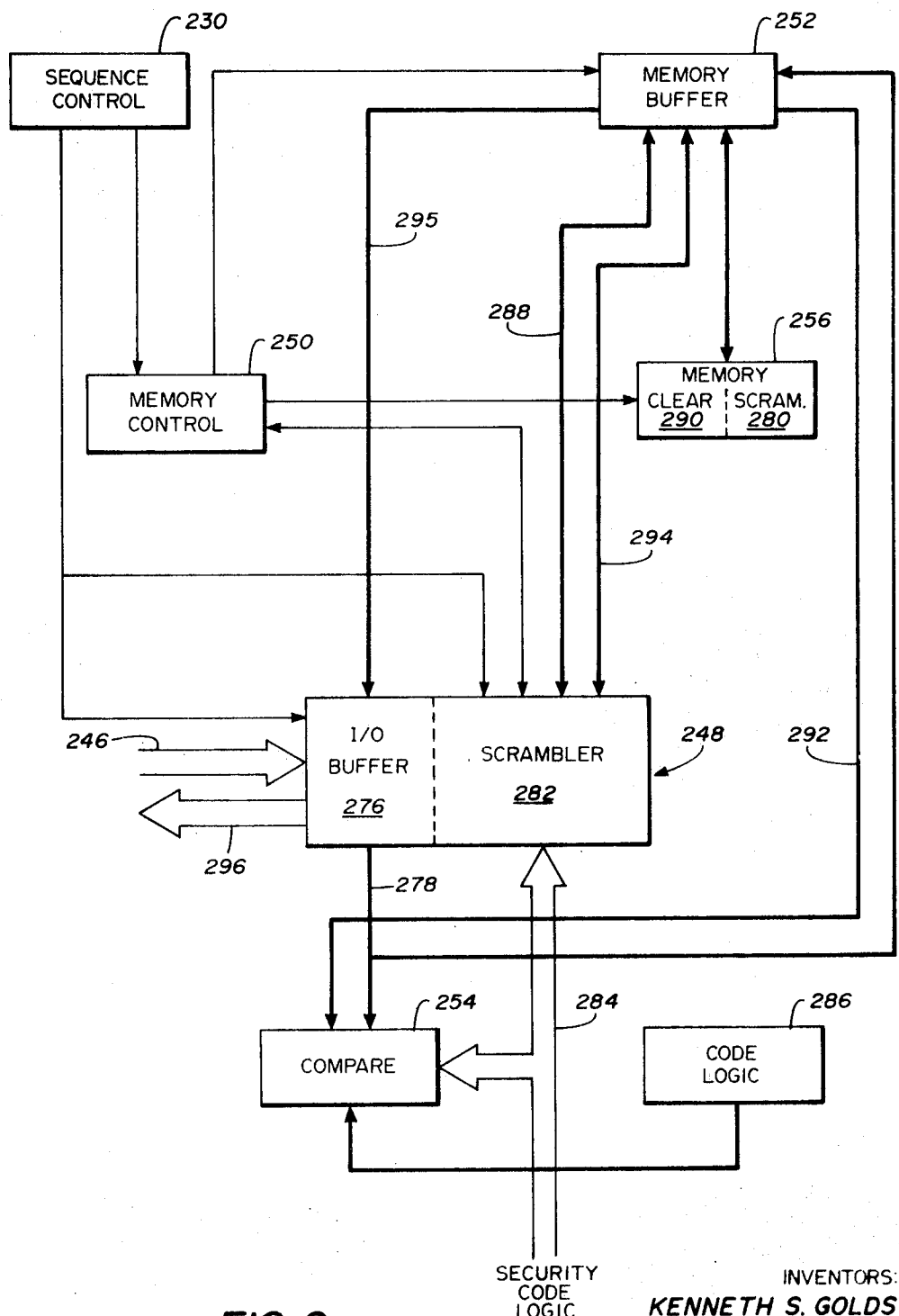
FIG. 9 is a detailed block diagram of the code scrambling subsystem.

Referring to FIG. 9, there is shown in detail a block diagram for unscrambling and scrambled data read from the magnetic stripe 26 of the credit card 22. The scrambled data transmitted through the read recovery logic 240 over channel 246 is transmitted through an input/output buffer 276 of the code scrambler 248. This scrambled data is then transmitted to the comparator 254 and the memory buffer 252 over channel 278. At this time, the scrambled data transmitted to the comparator 254 is not used. Scrambled data entering the memory buffer register 252 is channeled into a scrambled data memory section 280 of the memory 256. As mentioned, the buffer register 252 receives sequencing signals from the memory control 250 to advance the received data to the correct part of the scrambler subsystem.

Next in the scrambling and unscrambling sequence for the read data, the user's identification code is entered into the comparator 254 and the scrambler logic 282 of the code scrambler 248 over a channel 284. Also, logic information representing a particular bank code is entered into the comparator 254 from a bank code logic network 286.

One of the features of the present invention is the use of scrambled data on the credit card 22 in an effort to minimize unauthorized use thereof. Coded data on the credit card is scrambled, using one of numerous available keys. Each of these scrambling keys consists of several parts; one part is built into the system, another part of each key is carried by the data on the magnetic stripe 26, and still a third part of each key is included in the user's identification code.

After receiving the user's code over the channel 284, the scrambled data is retrieved from the memory 256 by the memory control 250 for the transmission to the scrambler logic 282. Upon receipt of the scrambled data, the scrambler logic 282 checks this data for the key data bits and combines them with the key from the user's code and the built-in logic to formulate a particular unscrambling key. With the unscrambling key determined, the scrambled data originally read from the magnetic stripe 26 is converted into clear logic data which is then transmitted over the channel 288 through the memory buffer 252 to the clear data section 290 of the memory 256.

At this point in the sequence, the system contains clear data for determining if a particular user has a right to receive currency from the system. Upon receipt of a signal from the memory control 250, the memory buffer register 252 transmits the clear data from the memory 256 to the comparator 254 over a channel 292. Comparison of the clear data is a straightforward operation and the various comparison steps are completed as described in FIGS. 5 through 7.

After completing the various comparisons, the memory control 250 again sequences the memory buffer 252 to transmit the clear data from the memory 256 to the scrambler logic 282. The scrambler logic 282 now rescrambles the clear data which has been updated to reflect the additional usage of the credit card. Again, the scrambler logic must first produce a scrambling key for the clear data. This scrambling key is determined by the user's identification code and the scrambling logic. Because the scrambling key depends in part on the scrambler logic, a different scrambling key will be used to scramble the data than was required to unscramble the initially read data. After generating the scrambling key and rescrambling the updated data, the scrambled data is transmitted over the channel 294 to the scrambled data section 280 of the memory 256 through the memory buffer register 252.

At this time, the scrambled data is ready to be rewritten on the magnetic stripe 26 of the credit card 22. The scrambled data is retrieved from the memory 256 and transmitted to the input/output buffer 276 through the memory buffer 252 over a channel 295. Scrambled data entering the buffer 276 passes through to the write logic network 266 over a channel 296. At the same time, the updated scrambled data passes through the buffer 276 over the channel 278 into the comparator 254. Scrambled data from the memory 256 is also transmitted over the channel 292 to the comparator 254. The purpose of a comparison at this time is to determine if the scrambled data written on the credit card 22 compares with the scrambled data retrieved from the memory 256. This is a functional check and will not interrupt the sequence for despensing cash to a user. If a comparison cannot be made in the comparator 254 at this time, data is transmitted over a channel 298 (referring to FIG. 8) to the printer control 272 to cause a receipt to be printed to notify the user that his card may contain improperly coded data. The user must then check with the issuing bank to determine if his credit card is still valid.

With the completion of this functional comparison in the comparator 254 and the writing of the new scrambled data on the magnetic stripe 26, the scrambling sequence is complete.

To unscramble and scramble coded information, the scrambler logic 282 employs a sophisticated, three-way scrambling technique. This three-way scrambling technique will be illustrated by means of an example. For ease in understanding the scrambling technique, the example will be an alphabetical scrambling of clear data. Assume for purposes of illustration that the scrambler logic 282 will scramble an original alphabetic text as follows:

Original Text: NOW IS THE TIME FOR ALL.    (1)

In the first step in scrambling the above excerpt, the scrambler logic divides the complete phrase into fixed-length words of arbitrary length (four characters to the word, for example). Any empty spaces are filled with randomly chosen letters in accordance with the first of four scrambling keys so that all words have equal length and appearance; these added characters are ignored during the unscrambling process. By filling the spaces between each work, the beginning and end of the excerpt is obscured. Obscuring the starting point in coded data increases the difficulty of breaking the coding keys. After completion of this first step, the excerpt at (1) appears as follows:

New Text:  /NOWX/ISPB/THEF/TIME/FORG/ALLR/

Word Order:    1    2    3    4    5    6    (2)

Now using the second of four scrambling keys as determined by the scrambler logic, in the second step the text is further scrambled by *word transposition*, i.e., changing the order of the words in the text. In the example, the word transposition scrambling key is 5-3-6-1-4-2. After the scrambler logic 282 has completed an operation with this second scrambling key, the test at (2) above, appears as follows:

New Text:  /FORG/THEF/ALLR/NOWX/TIME/ISPB/

Word Order:    5    3    6    1    4    2    (3)

A third scrambling key is now used by the scrambler logic 282 in a third scrambling step. This scrambling step may call for *character substitution* in accordance with the third scrambling key; for example, each letter is replaced by the next letter in alphabetical order. This results in the text at (3) appearing as follows:

New Text:  /GPSH/UIFG/BMMS/OPXY/UJNF/JTQC/

Character Number:  / 1234 / 1234 / 1234 / 1234 / 1234 / 1234 /    (4)

To complete the scrambling of the excerpt at (1), a fourth scrambling key is used to scramble the text by *character transposition*, i.e., changing the order of the characters in each word. Using as this last scrambling key the character substitution order 3-2-4-1, then the text at (4) results in scrambled data as follows:

Scrambled data:  /SPHG/FIGU/MMSB/XPYO/NJFU/QTCJ/

Transposition key:  / 3241 / 3241 / 3241 / 3241 / 3241 / 3241 /
    (5)

To unscramble the data appearing at (5), each of the four steps are performed in the reverse order. Each of the three keys used in the various steps must be made available to the scrambler logic 282 in order to complete the unscrambling of the scrambled data. In this example, the four scrambling processes and their respective keys are: (1) random character selection to fill spaces, (2) word transposition according to the order 536142, (3) character substitution using the next letter in alphabetical order, and (4) character transposition of each word according to the character order 3241.

In the above example, the key order was character selection, word transposition, character substitution, and character transposition. These four keys can be used in any order and the scrambling and unscrambling process will remain the same.

To enable the scrambler logic 282 to determine the proper scrambling keys, for a subsequent use of the credit card 22, part of each scrambling key is inserted into the scrambled data at preselected locations and written on the magnetic stripe 26. To unscramble data read from the credit card 22, the scrambler logic 282, as explained, originally scans the scrambled data for the key identifier bits and combines these bits with the user's identification code as received along the channel 284. From the data read from the magnetic stripe 26 and the user's identification code, the scrambler logic 282 determines the keys for unscrambling the coded data.

Although an alphabetical illustration was given to explain the scrambling technique, it should be understood, that the scrambler logic 282 actually operates on logic bits of information from a bit stream. Accordingly, a bit stream of logic ONES and logic ZEROS are received at the scrambler logic. The scrambler logic checks certain groups of bits for the scrambling keys required to unscramble the data presented.

After completing the comparison of the cleared data in the comparator 254, as explained, a different set of scrambling keys are used to rescramble the updated information. These new scrambling keys are then substituted for the ones originally read from the credit card 22 and are transmitted with the scrambled data over the channel 296. Again, these scrambling keys are contained in certain preselected groups of data bits.

The purpose of changing the scrambling key for each subsequent use of a credit card is to prevent analysis of the scrambled data to gain unauthorized entry into the system. As a result of changing the scrambling key with each card insertion, it has been estimated that the probability of breaking the system code of any one card is approximately $3 \times 10^{-16}$, or one chance in three quadrillion.

The cash transport system described herein is further described and claimed in the co-pending application Ser. No. 58,888, filed 7/28/70, of Marion R. Karecki, George R. Chastain and Thomas R. Barnes.

The cash drawer of the dispensing system described herein is described and claimed in the co-pending application Ser. No. 58,156, filed 7/29/70, of Marion R. Karecki and Thomas R. Barnes.

A system for sequencing the operation of the cash dispenser described herein is described and claimed in the co-pending application Ser. No. 59,150, filed 7/29/70, of Thomas R. Barnes, George R. Chastain and Don C. Wetzel.

The card transport and gate control system described herein is described and claimed in the co-pending application Ser. No. 59,241, filed 7/29/70, of John R. Hicks and William C. Bortzfield.

While only one embodiment of the invention, together with modifications thereof, has been described in detail herein and shown in the accompanying drawings, it will be evident that various further modifications are possible without departing from the scope of the invention.

What is claimed is:

1. A method of document decoding in a dispensing system comprising the steps of:

scanning scrambled data read from a cryptographically coded document for elements of an unscrambling key, manually entering an identification code containing additional elements of an unscrambling key into the dispensing system, combining elements from the coded document and from the identification code to produce an unscrambling key, unscrambling data read from a cryptographically coded document with the unscrambling key to generate clear data, and actuating the dispensing system with the clear data.

2. A method of document decoding in a dispensing system as set forth in claim 1 wherein the step of unscrambling data read from the coded document includes a multiple sequence of unscrambling steps as determined by the unscrambling key.

3. A method of document decoding in a dispensing system as set forth in claim 1 wherein the step of unscrambling data read from the coded document includes:

transposing code characters from the ordered arrangement as read.

4. A method of document decoding in a dispensing system as set forth in claim 3 wherein the step of unscrambling data read from the coded document includes:

substituting different code characters for the characters as received from the coded document.

5. A method of document decoding in a dispensing system as set forth in claim 4 wherein the step of unscrambling data read from the coded document includes:

dividing the code arrangement as read into a series of equal increment units, and transposing the equal increment units from the order as originally received from the coded document.

6. A method of document decoding in a dispensing system as set forth in claim 5 wherein the step of unscrambling data read from the coded document includes:

removing extraneous code characters from the transposed order.

7. A method of document decoding in a dispensing system as set forth in claim 3 wherein the step of unscrambling data read from the coded document includes:

dividing the code arrangement as read into a series of equal increment units, and transposing the equal increment units from the order as originally received from the coded document.

8. A method of document decoding in a dispensing system as set forth in claim 7 wherein the step of unscrambling data read from the coded document includes:

removing extraneous code characters from the transposed order.

9. A method of document decoding in a dispensing system as set forth in claim 3 wherein the step of unscrambling data read from the coded document includes:

removing extraneous code characters from the transposed order.

10. A method of document decoding in a dispensing system as set forth in claim 9 wherein the step of unscrambling data read from the coded document includes:

substituting different code characters for the characters as received from the coded document.

11. A method of document decoding in a dispensing system as set forth in claim 1 wherein the step of unscrambling data read from the coded document includes:

substituting different code characters for the characters as received from the coded document.

12. A method of document decoding in a dispensing system as set forth in claim 11 wherein the step of unscrambling data read from the coded document includes:

dividing the code arrangment as read into a series of equal increment units, and transposing the equal increment units from the order as originally received from the coded document.

13. A method of document decoding in a dispensing system as set forth in claim 12 wherein the step of unscrambling data read from the coded document includes:

removing extraneous code characters from the transposed order.

14. A method of document decoding in a dispensing system as set forth in claim 11 wherein the step of unscrambling data read from the coded document includes:

removing extraneous code characters from the transposed order.

15. A method of document decoding in a dispensing system as set forth in claim 1 wherein the step of unscrambling data read from the coded document includes:

dividing the code arrangement as read into a series of equal increment units, and transposing the equal increment units from the order as originally received from the coded document.

16. A method of document decoding in a dispensing system as set forth in claim 15 wherein the step of unscrambling data read from the coded document includes:

removing extraneous code characters from the transposed order.

17. A method of document decoding in a dispensing system as set forth in claim 1 wherein the step of unscrambling data read from the coded document includes:

removing extraneous code characters from the transposed order.

18. A method of cryptographic document coding in a dispensing system actuated in response to clear data, comprising the steps of:

generating a scrambling key based in part on elements contained in an identification code entered into the dispensing system, scrambling the clear data in accordance with the scrambling key to produce a cryptographically scrambled data arrangement, and combining elements of the scrambling key with the scrambled data for storage on a document for subsequent use thereof.

19. A method of document coding in a dispensing system as set forth in claim 18 including the step of entering an identification code containing elements of the scrambling key into the dispensing system.

20. A method of document coding in a dispensing system as set forth in claim 18 wherein the step of scrambling the clear data includes:

inserting extraneous code characters into blank spaces between words of the clear data, and dividing the clear data into a series of equal increment units.

21. A method of document coding in a dispensing system as set forth in claim 20 wherein the step of scrambling the clear data includes:

transposing the equal increment units from the order as used to actuate the dispensing system.

22. A method of document coding in a dispensing system as set forth in claim 21 wherein the step of scrambling the clear data includes:

substituting different code characters for the characters as originally appearing in the clear data.

23. A method of document coding in a dispensing system as set forth in claim 22 wherein the step of scrambling the clear data includes:

transposing the code characters from the arrangement of the clear data.

24. A method of document coding in a dispensing system as set forth in claim 20 wherein the step of scrambling the clear data includes:

substituting different code characters for the characters as originally appearing in the clear data.

25. A method of document coding in a dispensing system as set forth in claim 24 wherein the step of scrambling the clear data includes:

transposing the code characters from the arrangement of the clear data.

26. A method of document coding in a dispensing system as set forth in claim 20 wherein the step of scrambling the clear data includes:

transposing the code characters from the arrangement of the clear data.

27. A method of document coding in a dispensing system as set forth in claim 26 wherein the step of scrambling the clear data includes:
transposing the equal increment units from the order as used to actuate the dispensing system.

28. A method of document coding in a dispensing system as set forth in claim 18 wherein the step of scrambling the clear data includes:
transposing the equal increment units from the order as used to actuate the dispensing system.

29. A method of document coding in a dispensing system as set forth in claim 28 wherein the step of scrambling the clear data includes:
substituting different code characters for the characters as originally appearing in the clear data.

30. A method of document coding in a dispensing system as set forth in claim 29 wherein the step of scrambling the clear data includes;
transposing the code characters from the arrangement of the clear data.

31. A method of document coding in a dispensing system as set forth in claim 28 wherein the step of scrambling the clear data includes:
transposing the code characters from the arrangement of the clear data.

32. A method of document coding in a dispensing system as set forth in claim 18 wherein the step of scrambling the clear data includes:
substituting different code characters for the characters as originally appearing in the clear data.

33. A method of document coding in a dispensing system as set forth in claim 32 wherein the step of scrambling the clear data includes:
transposing the code characters from the arrangement of the clear data.

34. A method of document coding in a dispensing system as set forth in claim 18 wherein the step of scrambling the clear data includes:
transposing the code characters from the arrangement of the clear data.

35. A method of coded document operation of a dispensing system, comprising the steps of:
scanning scrambled data read from a cryptographically coded document for elements of an unscrambling key,
manually entering an identification code containing additional elements of an unscrambling key into the dispensing system,
combining the elements read from the coded document and from the identification code to produce an unscrambling key,
unscrambling data read from the coded document with the unscrambling key to generate clear (decoded) data,
actuating the dispensing system with the clear data, and
rescrambling the clear data in accordance with a scrambling key to produce a cryptographically scrambled data arrangement other than the arrangement as read from the coded document.

36. A method of coded document operation of a dispensing system as set forth in claim 35, including the step of:
generating a scrambling key with elements from the identification code.

37. A method of coded document operation of a dispensing system as set forth in claim 36, including the step of:
combining elements of the scrambling key with the scrambled data for storage on a coded document for subsequent use thereof.

38. A method of coded document operation of a dispensing system as set forth in claim 37 wherein the steps of unscrambling data read from the coded document and rescrambling the clear data includes:
dividing the data arrangement into a series of equal increment units,
transposing the equal increment units from the order as originally received,
substituting different code characters for the characters as received,
transposing the code characters from the ordered arrangement as originally presented, and
removing extraneous code characters from the equal increment units.

39. A method of checking the validity of a credit card, comprising the steps of:
reading cryptographically scrambled data as stored on said credit card,
scanning the scrambled data read from said credit card for elements of an unscrambling key,
manually entering an identification code containing additional elements of an unscrambling key,
combining elements from the coded document and from the identification code to produce an unscrambling key,
converting the scrambled data by said unscrambling key into data having an ordered arrangement,
comparing the ordered data arrangement with standard data to check the validity of said credit card,
rescrambling the ordered data arrangement in accordance with a scrambling key that produces a data arrangement other than the arrangement as read, and
storing the rescrambled data onto said credit card.

40. A method of checking the validity of a credit card as set forth in claim 39 wherein the step of rescrambling the ordered data arrangement includes:
inserting extraneous code characters into blank spaces of the ordered code arrangement, and
dividing the ordered code arrangement into a series of equal increment units.

41. A method of checking the validity of a credit card as set forth in claim 40 wherein the step of rescrambling the ordered data arrangement includes:
transposing the equal increment units from the order as originally received from said credit card.

42. A method of checking the validity of a credit card as set forth in claim 41 wherein the step of rescrambling the ordered data arrangement includes:
substituting different code characters for the characters as received from said credit card.

43. A method of checking the validity of a credit card as set forth in claim 42 wherein the step of rescrambling the ordered data arrangement includes:
transposing the code characters from the ordered arrangement as originally presented.

44. A method of checking the validity of a credit card as set forth in claim 40 wherein the step of rescrambling the ordered data arrangement includes:
substituting different code characters for the characters as received from said credit card.

45. A method of checking the validity of a credit card as set forth in claim 44 wherein the step of rescrambling the ordered data arrangement includes:
transposing the code characters from the ordered arrangement as originally presented.

46. A method of checking the validity of a credit card as set forth in claim 40 wherein the step of rescrambling the ordered data arrangement includes:
transposing the code characters from the ordered arrangement as originally presented.

47. A method of checking the validity of a credit card as set forth in claim 46 wherein the step of rescrambling the ordered data arrangement includes:
transposing the equal increment units from the order as originally received from said credit card.

48. A method of checking the validity of a credit card as set forth in claim 39 wherein the step of rescrambling the ordered data arrangement includes:
transposing the equal increment units from the order as originally received from said credit card.

49. A method of checking the validity of a credit card as set forth in claim 48 wherein the step of rescrambling the ordered data arrangement includes:

substituting different code characters for the characters as received from said credit card.

50. A method of checking the validity of a credit card as set forth in claim 49 wherein the step of rescrambling the ordered data arrangement includes:
transposing the code characters from the ordered arrangement as originally presented.

51. A method of checking the validity of a credit card as set forth in claim 48 wherein the step of rescrambling the ordered data arrangement includes:
transposing the code characters from the ordered arrangement as originally presented.

52. A method of checking the validity of a credit card as set forth in claim 39 wherein the step of rescrambling the ordered data arrangement includes:
substituting different code characters for the characters as received from said credit card.

53. A method of checking the validity of a credit card as set forth in claim 52 wherein the step of rescrambling the ordered data arrangement includes:
transposing the code characters from the ordered arrangement as originally presented.

54. A method of checking the validity of a credit card as set forth in claim 39 wherein the step of rescrambling the ordered data arrangement includes:
transposing the code characters from the ordered arrangement as originally presented.

55. A method of checking the validity of a credit card as set forth in claim 39, including the step of modifying the ordered code arrangement prior to rescrambling.

56. A method of checking the validity of a credit card as set forth in claim 39, including the step of generating a scrambling key that varies for subsequent readings of a credit card.

57. In a cryptographically coded document controlled article dispensing system for dispensing articles to a customer upon presentation of a valid document:
means for reading cryptographically scrambled data from a coded document presented to said system,
means for scanning the scrambled data as read from the coded document for elements of an unscrambling key,
means for manually entering an identification code containing additional elements of an unscrambling key into the dispensing system,
means for combining elements from the coded document and from the identification code to generate an unscrambling key,
means receiving the scrambled data for conversion thereof into clear data in accordance with said unscrambling key,
means for comparing the clear data with standard data to check the validity of the presented document,
means receiving the clear data for rescrambling in accordance with a scrambling key to produce a code arrangement other than the arrangement as read, and
means for storing the rescrambled data on the presented document.

58. In a coded document article dispensing system as set forth in claim 57 wherein the scrambling key of said means for receiving the clear data produces a rescrambled data arrangement in a multiple step sequence.

59. In a coded document article dispensing system as set forth in claim 57 wherein the unscrambling key of said means receiving the scrambled data produces the clear data in a multiple step sequence.

60. In coded document article dispensing system as set forth in claim 58 including means for keying-in the standard data into said means for comparing.

61. In a coded document article dispensing system as set forth in claim 58 including means for modifying the clear data after comparison with the standard data prior to rescrambling.

62. In a coded document article dispensing system as set forth in claim 58 including means for generating a scrambling key that varies for subsequent readings of a coded document.

63. In a coded document controlled article dispensing system as set forth in claim 62 wherein said means for generating a scrambling key includes:
means for dividing the clear data into a series of equal increment units and inserting extraneous randomly chosen code characters into the clear data,
means for transposing the equal increment units from the order as received,
means for substituting characters for those originally appearing in the presented code, and
means for transposing the code characters from the order as received.

64. In a cryptographically coded document controlled dispensing system:
means for reading cryptographically scrambled data from a document presented for operation of the dispensing system,
means receiving the scrambled data for conversion thereof into clear data in accordance with an unscrambling key,
means for comparing the clear data with standard data and generating a dispensing signal when the compared data is similar,
means responsive to the dispensing signal for actuating the dispensing system for article delivery to a customer,
rescrambling means receiving the clear data for rescrambling in accordance with a scrambling key to produce a data arrangement other than the arrangement as read, and
means for storing the rescrambled code on the presented document.

65. In a coded document controlled dispensing system as set forth in claim 64 including means for keying-in the standard data into said comparison means.

66. In a coded document controlled dispensing system as set forth in claim 65 including means for generating a scrambling key that varies for subsequent readings of a coded document.

67. In a coded document controlled dispensing system as set forth in claim 66 including means for modifying the clear data prior to rescrambling in said scrambling means.

68. In a coded document controlled dispensing system as set forth in claim 67 wherein said data is in the form of a data bit stream.

* * * * *